April 22, 1924.

R. B. RATHBUN

INSULATING LIME SEAL

Filed June 28, 1920

1,491,274

Inventor
Ross B. Rathbun
By his Attorney
Albert M. Austin.

Patented Apr. 22, 1924.

1,491,274

UNITED STATES PATENT OFFICE.

ROSS BUXTON RATHBUN, OF SALT LAKE CITY, UTAH, ASSIGNOR TO AMERICAN SMELTING AND REFINING COMPANY, OF NEW YORK, N. Y., A CORPORATION OF NEW JERSEY.

INSULATING LIME SEAL.

Application filed June 28, 1920. Serial No. 392,456.

*To all whom it may concern:*

Be it known that I, Ross Buxton Rathbun, a citizen of the United States, and resident of Salt Lake City, in the county of Salt Lake and State of Utah, have invented certain new and useful Improvements in Insulating Lime Seals, of which the following is a specification.

The invention relates in general to an improvement in electric insulation of the type usually employed for leading high potential wires into power houses and sub-stations and specifically relates to a means for insulating spaced apart members having different potential characteristics in the presence of conditions where conductive fluids or solids are likely to collect on the insulation and give rise to surface conduction between the spaced members.

Difficulty has been experienced heretofore in installing a conductor in a wall for the reason that acid dust in the atmosphere in time causes the formation of a conducting layer between the conductor and the wall which eventually causes leakage between the conductor and wall and this is especially noticeable in situations where currents of high potential are carried by the conductor.

It is further obvious that in metallurgical plants where an acid gas is to be confined to one side of the wall of a containing receptacle for instance a receptacle containing $SO_3$ the tendency of such a gas to precipitate an electric conducting layer on any of the usual forms of insulation leads rapidly to a breaking down of the insulating properties of any seal, or conductor covering disposed between the conductor and the adjacent portion of the wall.

Accordingly, one of the primary objects of the invention is to provide a simple form of insulation between two members having different potentials which will be maintained effective in the presence of surface conductor forming fluids contacting with the same.

As the conductor forming fluid is usually an acid gas the invention contemplates the utilization of a basic material which not only constitutes a medium of high dielectric strength but which will also possess the property of destroying or at least tending to minimize the property of the acid gas to form the electric surface conductor. However, the invention is sufficiently inclusive to cover situations where the fluid carries an electrolyte or substance which may form an electrolyte and may be an acid, a base or a neutral substance.

An incidental object of the invention therefore is to provide a form of insulating material which will act to destroy the conducting properties of the fluid, such as in the case of the acid gases to absorb the gases contacting therewith and thus prevent their passage therethrough and at the same time maintain, as far as possible, the necessary high insulating feature required in situations where the insulators must be of relatively small thickness with great differences in electrical potentials of the members on opposite sides of the insulation.

When considered in connection with its sealing feature the invention contemplates the utilization of the insulation as a seal to prevent or at least minimize gas leakage between the insulated members.

In the accompanying drawings and in the following description, the invention is shown in connection with receptacle or conduit for gaseous acid mixtures, into which it is desired to lead an electric conductor for the reason that in such an organization there is present normally all of the conditions favorable to the short-circuiting of the current from the high potential conductor leading into an acid gas containing space to the adjacent part of the metallic receptacle defining the gas space.

It is understood, however, that the showing is merely suggestive of one place where the invention can be used to advantage but the application of the invention is equally applicable to any place where porcelain bushings are usually employed or where it is desired to maintain a conductor insulated from its surroundings and in the presence of agencies which ordinarily tend to break down the insulating bodies carrying the conductor.

Various other objects and advantages of the invention will be in part obvious from an inspection of the accompanying drawings and in part will be more fully set forth in the following particular description of one form of device embodying my invention, and the invention also consists in certain new and novel features of construction and combination of parts hereinafter set forth and claimed.

In the accompanying drawings:—

Figure 1:
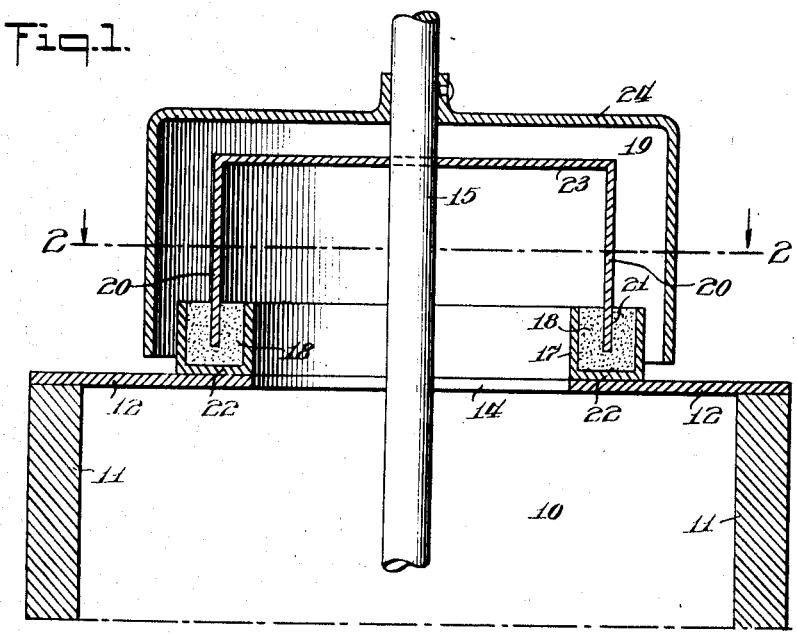
Figure 1 is a vertical transverse sectional view through the upper side of a gas-containing receptacle equipped on its upper side with a preferred embodiment of my invention.

In the following description and in the claims, parts will be identified by specific names for convenience of expression but they are intended to be as generic in their application to similar parts as the art will permit.

In the drawings there is shown an acid gas containing chamber 10 provided with a chamber cover 12 defining the top of the chamber 10. The cover 12 is provided with a circular opening 14, through which depends a conductor 15.

Figure 2:
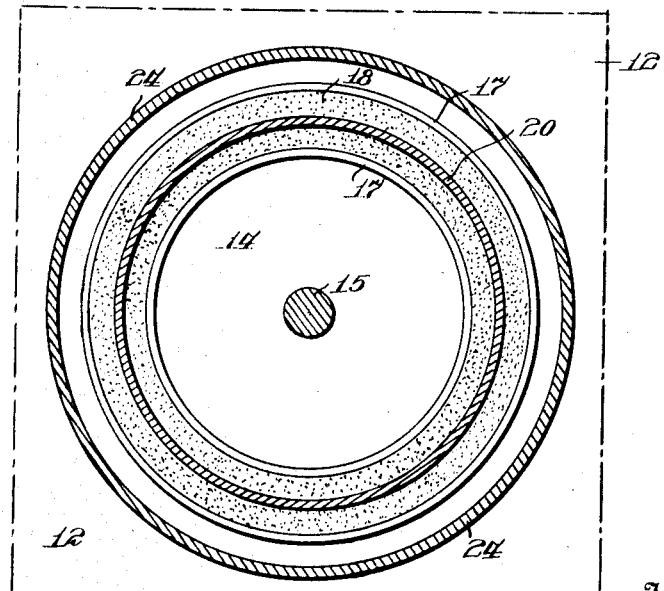
Figure 2 is a horizontal transverse sectional view through the seal shown in Figure 1 and taken on the line 2—2 of this Figure looking in the direction indicated by the arrows.

The opening 14 is surrounded by an annular opened top trough 17 containing a substance 18, which has a high dielectric constant. It is further required that the substance react with the particular gases present and which may include water vapor to give a product having a high dielectric constant. In situations where water is present it is required that the substance have a relatively low solubility in water or solutions of possible electrolytes and that the original substance and product formed be a good absorbent of water preferably by a chemical reaction. In the situation selected for illustration the substance 18 is crushed lime but this particular substance is merely suggestive of one form of material capable of being used. A closure 19 for the opening 14 is in the form of a bell having a depending, circular wall 20, the lower portion 21 of which extends centrally into the trough, as shown in Figure 2, and terminates below the level of the lime and in spaced relation to the bottom 22 of the trough. The head 23 of the bell has an air-tight engagement with the conductor 15 herein shown to be in the form of a wire and is arranged so as to prevent gas leakage from the chamber 10 between the conductor and the bell closure.

It is understood that in such devices the chamber 10 contains a gas having an appreciable acid content and that the lime seal disclosed prevents the passage of this gas from the chamber through the opening around the conductor 15 if the gas is under pressure and prevents the entrance of air into the chamber if the gas in the chamber is under suction. The lime insulation provides a medium of high dielectric strength between the grounded cover 12 of the chamber and the high potential conductor 15. In addition to its function as an insulator the lime acts as an absorbent which quickly takes up and neutralizes any free acid which may come in contact with or condense on the same. Providing the lime in crushed or granular form has the advantage over a solid lump in that the small particles provide a relatively great surface, increasing the path over which current must leak and at the same time provides air interstices which tend to increase its insulating properties.

The air slacking of the lime does not appreciably diminish its dielectric properties for in its anhydrous form it still constitutes an insulator and incidentally forms in actual use certain compounds which continue to provide high dielectric conditions. The lime seal can be readily replaced with fresh lime should the insulating properties of the used lime become deteriorated for any reason. However, by supplying a large mass of the lime it can be used without replacing for a long period of time. A thickness of one inch of the lime layer has been found ample for insulating a voltage of 2500 volts and a device of the type illustrated.

While lime has been selected for the discussion of the disclosure in this application due primarily to its cheapness, it is understood that the disclosure is of sufficient extent to include any form of chemical substance, capable of reacting with the particular fluid present to destroy any conducting property of the fluid and without materially affecting the insulating property of the seal. As an illustration of one such material, reference is made to zinc oxide which could be substituted for the lime in the illustrated disclosure where phosphoric acid was present in the receptacle.

In the present disclosure it may be considered that the wall 20 is formed of some insulating material and that the wall is coated with a lime composition, one suggested form of which may be a white-wash.

Where the seal is exposed it is suggested that an umbrella 24 be positioned over the same to protect the insulating filler.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:—

1. An insulating body comprising a plurality of spaced apart hollow members including upstanding walls adapted to have different potential characteristics, a non-conducting substance in contact with the opposite contiguous walls of said hollow members thereby forming a sealed connection between the members, said substance constituting a gas barrier between the members and being in granular form to provide small air interstices.

2. In a device of the class described, the combination with an electric conductor, of an insulating member surrounding the same and which may be subjected to the depositing thereon of a conducting medium, said member including a chemical reagent designed to react on the conducting medium deposited thereon to minimize its conducting property.

3. In a device of the class described, the combination of a member defining one side of a space which has a fluid therein capable of forming an electric conductor, an electric conductor passing through said member and into said space and a chemical reagent possessing high dielectric strength disposed in juxtaposition to the point where the electric conductor passes through said member, said reagent characterized by the property of reacting on the conductor forming fluids to prevent the formation on the reagent of a conducting medium adjacent the conductor.

4. A closed receptacle adapted to contain a gas of a substance which, when condensed, forms a conducting medium, said receptacle provided with an opening in one side thereof, an electric conductor entering the receptacle through said opening, a closure for the opening having an air-tight engagement with the conductor to prevent leakage between the conductor and closure, an annular trough surrounding said opening, having an air-tight engagement with the part of the receptacle outlining the opening, and containing part of said closure, and lime contained in said trough and positioned between the same and the closure.

5. In a device of the class described, the combination with a plate provided with an opening extending therethrough, a conductor passing through said opening in spaced relation to the plate, an annular trough carried by the plate and surrounding the opening, a gas absorbent and insulating material in said trough and a bell carried by the conductor extending into the insulating material in the trough.

6. In a device of the class described the combination with an annular trough, containing a dry, soluble substance capable of minimizing the formation of a circuit forming medium, of a bell bridging across the center of the trough and extending into the substance and means for protecting the substance in the trough from the dissolving action of rain falling on the device when exposed to the weather.

7. In a device of the class described, the combination with a support, provided with an opening extending therethrough, a conductor passing through said opening in spaced relation to the support, and a closure for the opening including a lime containing seal.

8. In a device of the class described, the combination with a support, provided with an opening extending therethrough, a conductor passing through said opening in spaced relation to the support, and a closure for the opening including a lime containing seal and an umbrella for protecting the closure.

9. In a device of the class described, the combination of a trough having a body of lime therein, an electric conductor and a wall having its lower part embedded in said body of lime.

10. A receptacle adapted to contain a gaseous fluid, said receptacle provided with an opening, an electric conductor entering the receptacle through said opening and sealing means between the conductor and the receptacle including means adapted to react on the fluid to prevent the formation of a conducting medium between said conductor and receptacle.

11. A bushing for surrounding an electric conductor, said bushing having high dielectric strength and including a material capable of reacting with acid gases which may contact therewith to prevent the said gases from forming a conducting medium across the bushing.

12. An insulator having high dielectric strength adapted to be exposed to gaseous fluids which normally tend deleteriously to affect the insulating properties of insulators, said insulator including chemical means adapted to react with the fluid to prevent the formation of a conducting medium on the insulator.

Signed of Salt Lake City in the county of Salt Lake and State of Utah this 24th day of May, A. D. 1920.

ROSS BUXTON RATHBUN.